US007116642B2

(12) United States Patent
Tofinetti et al.

(10) Patent No.: US 7,116,642 B2
(45) Date of Patent: Oct. 3, 2006

(54) SONET/SDH DATA LINK ADMINISTRATION AND MANAGEMENT

(75) Inventors: Michael Nicholas Tofinetti, Kanata (CA); Jane Zhan, Nepean (CA); Dan Falkenham, Ottawa (CA); Felix Katz, Ottawa (CA); Jizong Li, Ottawa (CA); Trevor Dale Janes, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 789 days.

(21) Appl. No.: 09/987,830

(22) Filed: Nov. 16, 2001

(65) Prior Publication Data

US 2003/0101248 A1   May 29, 2003

(51) Int. Cl.
*H04J 3/14* (2006.01)
*H04L 12/24* (2006.01)
(52) U.S. Cl. ...................................... 370/254
(58) Field of Classification Search ................ 709/223, 709/224; 370/254
See application file for complete search history.

(56) References Cited

U.S. PATENT DOCUMENTS 5,226,120 A    7/1993  Brown et al.
5,440,540 A    8/1995  Kremer
2002/0165961 A1 * 11/2002 Everdell et al. ............. 709/225
2004/0015309 A1 *  1/2004 Swisher et al. ............... 702/79

FOREIGN PATENT DOCUMENTS

EP    1 043 871 A2   10/2000
WO    WO 01/80596 A1   10/2001

* cited by examiner

*Primary Examiner*—Derrick Ferris
(74) *Attorney, Agent, or Firm*—Marks & Clerk; S. Mark Budd

(57) ABSTRACT

A network management and administration system provisioning data links in an optical networking environment is provided. The network management and administration system makes use of connectivity information in establishing and monitoring data links. The connectivity information includes data link termination specifications. Data link termination specifications include port and channel specifications. Each port may have a channelized or an unchannelized configuration. A virtual channel having a data transport capacity substantially equal to that of a corresponding unchannelized port is defined therefor. The advantages include a standardized, concise and comprehensive provisioning and presentation of data links.

7 Claims, 4 Drawing Sheets

FIG. 2

Central Data Link Record — 200

| Link ID | Origination | | | | | | | Destination | | | | | | | Link Capacity |
|---|---|---|---|---|---|---|---|---|---|---|---|---|---|---|---|
| | Node | Shelf | Slot | Card | Port | Port Type | Channel | Node | Shelf | Slot | Card | Port | Port Type | Channel | |
| 0001 | North | # | ## | 01 | # | Chann'd | 4 of 4 | West | # | ## | 02 | # | UnChann'd | (1 of 1) | OC-48 |
| 0002 | North | # | ## | 02 | # | Chann'd | 11 of 16 | South | # | ## | 01 | # | Chann'd | 3 of 4 | OC-12 |
| 0003 | North | # | ## | 02 | # | Chann'd | 13 of 16 | East | # | ## | 01 | # | UnChann'd | (1 of 1) | OC-12 |
| 0004 | East | # | ## | 02 | # | UnChann'd | (1 of 1) | South | # | ## | 01 | # | Chann'd | 2 of 4 | OC-12 |
| 0005 | South | # | ## | 02 | # | UnChann'd | (1 of 1) | West | # | ## | 01 | # | UnChann'd | (1 of 1) | OC-48 |
| ... | ... | ... | ... | ... | ... | ... | ... | ... | ... | ... | ... | ... | ... | ... | ... |

FIG. 3

Nodal Data Link Record associated with the North Node — 300

| Link ID | Shelf | Slot | Card | Port | Port Type | Channel | Rx/Tx | Link Capacity |
|---|---|---|---|---|---|---|---|---|
| 0003 | # | ## | 02 | # | Chann'd | 3 of 16 | Output | OC-12 |
| ... | ... | ... | ... | ... | ... | ... | ... | ... |

Nodal Data Link Record associated with the East Node — 300

| Link ID | Shelf | Slot | Card | Port | Port Type | Channel | Rx/Tx | Link Capacity |
|---|---|---|---|---|---|---|---|---|
| 0003 | # | ## | 01 | # | UnChann'd | (1 of 1) | Input | OC-12 |
| ... | ... | ... | ... | ... | ... | ... | ... | ... |

SONET/SDH DATA LINK ADMINISTRATION AND MANAGEMENT

FIELD OF THE INVENTION

The invention relates to data network provisioning and management, and in particular to methods of administration and management of high capacity data links.

BACKGROUND OF THE INVENTION

In the field of data transport, Synchronous Optical NETwork (SONET) and Synchronous Digital Hierarchy (SDH) are a set of related standards for synchronous data transmission over fiber optic networks. SONET is the North American version of the standard published by the American National Standards Institute (ANSI). SDH is the international version of the standard published by the International Telecommunications Union (ITU).

SONET/SDH data transport technologies are enabled by SONET/SDH data switching equipment, data transport equipment, interface equipment, etc. each supporting the SONET/SDH transmission protocols. SONET/SDH technology was developed and initially used for high capacity data transport in the core of data transport networks and in particular at the physical Layer 1 (ref. Open Systems Interconnection hierarchy—OSI).

Physical Layer 1 connectivity is implemented hop-by-hop between data ports. Cables are connected physically (Layer 1) to the ports to convey data therethrough. The conveyance of data includes unidirectional and bi-directional data transfers. Each port has a physical data transport capacity.

TABLE 1

Data transport capacity hierarchy showing SONET - SDH equivalents.

| Optical Level | Electrical Level | Line Rate (Mbps) | Payload Rate (Mbps) | Overhead Rate (Mbps) | SDH Equivalent |
|---|---|---|---|---|---|
| OC-1 | STS-1 | 51.840 | 50.112 | 1.728 | — |
| OC-3 | STS-3 | 155.520 | 150.336 | 5.184 | STM-1 |
| OC-9 | STS-9 | 466.560 | 451.008 | 15.552 | STM-3 |
| OC-12 | STS-12 | 622.080 | 601.344 | 20.736 | STM-4 |
| OC-18 | STS-18 | 933.120 | 902.016 | 31.104 | STM-6 |
| OC-24 | STS-24 | 1244.160 | 1202.688 | 41.472 | STM-8 |
| OC-36 | STS-36 | 1866.240 | 1804.032 | 62.208 | STM-12 |
| OC-48 | STS-48 | 2488.320 | 2405.376 | 82.944 | STM-16 |
| OC-96 | STS-96 | 4976.640 | 4810.752 | 165.888 | STM-32 |
| OC-192 | STS-192 | 9953.280 | 9621.504 | 331.776 | STM-64 |

A group of Layer 1 data transport capacities are defined for SONET/SDH ports. The group of data transport capacities forms a data transport capacity hierarchy known as Optical Carrier Hierarchy (OC) or the Synchronous Transport Mode (STM) capacity hierarchy respectively and is presented in the Table 1. Correspondingly, the ports are referred to as: OC-3/STM-1 ports, OC-48/STM-16 ports, etc. For the remainder of this presentation, reference will only be made to SONET technologies and it is understood to include SDH technologies.

Typically SONET ports are implemented on interface cards. Exemplary configurations include interface cards having: 2 OC-192 ports, 4 OC-48 ports, 8 OC-12 ports, 16 OC-3 ports, etc. SONET ports may also form an integral part of a data network node.

Data network nodes (data switching equipment, data transport equipment, etc.) may have Layer 1 implementations including at least one shelf to receive a plurality of interface cards. The connectivity between a node and an interface card is provided via a slot connector. Slots are keyed shelf recesses into which physical interface cards are inserted. Typically there is a one-to-one correspondence between slots and slot connectors while no implied one-to-one

TABLE 2

Exemplary port configurations

| Port | Type | Partitioning |
|---|---|---|
| OC-192 | unchannelized | none |
|  | channelized | 1 × OC-192 channel |
|  |  | 4 × OC-48 channels |
|  |  | 16 × OC-12 channels |
|  |  | 64 × OC-3 channels |
| OC-48 | unchannelized | none |
|  | channelized | 1 × OC-48 channel |
|  |  | 4 × OC-12 channels |
|  |  | 16 × OC-3 channels |
| OC-12 | unchannelized | none |
|  | channelized | 1 × OC-12 channel |
|  |  | 4 × OC-3 channels |
| OC-3 | unchannelized | none |
|  | etc. |  | correspondence exists between interface cards and slots. An interface card may occupy several slots in a shelf although using only one slot connector.

Typically a variety of interface cards supporting data transport technologies other than SONET may be connected to a node either to provide distribution side connectivity and/or provide bridging across data transport networks.

Recently however, the bandwidth demand for data transport in the edge and/or access portions of data transport networks has increased such that the use of SONET technologies has extended beyond the core of data transport networks for which SONET technologies were initially designed.

The migration of SONET technology beyond the core of data transport networks is paralleled by Packet-over-SONET (POS) technologies which are being developed to enable SONET data network nodes to convey Internet Protocol (IP) packets directly over SONET frames. A SONET port enabling the conveyance of IP data traffic is known as a POS port. SONET data links conveying IP data traffic are know as POS links.

In order to address data service specific bandwidth requirements, it is common for the raw bandwidth of a POS port to be partitioned. An unpartitioned POS port is known as an unchannelized port. The unchannelized configuration of a POS port enables access to the full OC/STM bandwidth thereof. The channelization is a Layer 1 logical bandwidth partitioning enabling a more efficient utilization of the raw bandwidth of a POS port. Table 2 shows exemplary Layer 1 POS port configurations.

OSI Data Link Layer 2 connections are setup to convey data traffic between nodes. At the core, Layer 2 connectivity includes port specifications for both ends of a data connection. A data connection having an allocated bandwidth, represents a data link. The variety of data link configurations include:

POS data links between two channelized POS ports, each end of each POS data link being associated with a channel on a corresponding channelized POS port; and POS data links between two unchannelized POS ports, each end of each POS data link being associated with a corresponding unchannelized physical POS port.

Since Layer 1 physical connectivity is made between ports via port connectors, a hybrid type of connectivity including:

POS data links between a corresponding unchannelized POS physical port at one end and a corresponding channel on a channelized POS port at the other end, is enabled at Layer 1 by the use of intermediary devices providing multiplexing and demultiplexing functionality such as: add/drop multiplexers, resilient packet ring nodes, etc.

The provisioning of data transport over SONET technologies in a data transport network requires the establishment of POS data links. For network core data transport provisioning, the POS data links tend to be relatively few in number and at the same time tend to have large data transport capacities. The relatively small number of POS data links renders a manual provisioning thereof adequate. The complexity of POS data link connectivity presented above is balanced by the relatively small number of POS data links required to be maintained and administered.

The number of POS links necessary to be set up and maintained increases with the migration of SONET technologies beyond the core of data transport networks as IP packet switching technologies are used to deploy end user services. The complexity of the connectivity of POS links therefore introduces a large overhead no longer lending itself to manual provisioning and management thereof.

Further, the configuration physical Layer 1 complexity of POS ports into channelized configurations or unchannelized configurations is relevant for POS data link connectivity at set-up. However, as it pertains to data network administration and management, the actual physical port configuration, once physical and data link connectivity is established, has a lower importance in providing network management solutions.

Prior practice in data transport provisioning includes the management of Time Division Multiplexed (TDM) links and particularly what are known as T1 connections. Correspondingly, T1 ports can also be configured as channelized or unchannelized. The current field practice treats these two types of T1 port configurations as being incompatible for physical Layer 1 interconnection purposes. A distinction is made between Layer 2 data links: those provisioned between unchannelized ports as opposed to those provisioned between channels on channelized ports.

In providing network management solutions, the migration of SONET technologies beyond the core utilizes an increased number of intermediary SONET physical layer data transport devices. A network management workstation providing an administration and management interface to an analyst is cluttered by the multitude of physical layer SONET devices used in provisioning POS data links. Physical layer SONET devices include: physical long haul optical cables, add/drop multiplexers, physical short haul copper links, (optical) interconnects, (optical) switches, aggregation/deaggregation nodes, Wavelength Division Multiplexers (WDM), Dense Wavelength Division Multiplexers (DWDM) etc.

There is a need to solve the above mentioned issues. Concise and comprehensive methods are necessary for provisioning, administering and managing POS data connections.

SUMMARY OF THE INVENTION

In accordance with an aspect of the invention, a network management and administration system is provided. Network management and administration system includes a first body of data link connectivity information and a display interface showing a current state of the data network including established data links. The first body of data link connectivity holds connectivity information for a plurality of data links established in the associated data network. The connectivity information specifies data link terminations including channel specifications. The connectivity information also specifies ports on which each data link of the plurality of data links terminates. The ports have a channelized or an unchannelized configuration. The channel specification for each unchannelized port includes a virtual channel specification associated therewith.

In accordance with a further aspect of the invention, the network management and administration system further includes a second body of connectivity information enabling the selection of data link terminations for the establishment of data links in the data network. The connectivity information held in the second body of connectivity information specifies data link terminations down to a channel specification. The connectivity information regarding data link terminations also specifies ports on which each data link terminates. The ports having a channelized or an unchannelized configuration. The channel specification for each unchannelized port includes a virtual channel specification associated therewith.

In accordance with a further aspect of the invention, a method of provisioning a data link in a data networking environment is provided. The method includes a sequence of steps. A first and a second data link terminations are selected from a selection group of data link terminations. Specifications of the first and second data link terminations include channel specifications. The selected first and second data link terminations are validated with respect to a data transport capacity and a data transport protocol. The validated selections are used in establishing a data link.

In accordance with a yet another aspect of the invention, the method further includes steps of updating bodies of connectivity information to keep a record of the established data link.

The advantages include a standardized, concise and comprehensive provisioning and presentation of data links.

BRIEF DESCRIPTION OF THE DRAWINGS

The features and advantages of the invention will become more apparent from the following detailed description of the preferred embodiments with reference to the attached diagrams wherein:

FIG. 2 is a schematic diagram showing a tabular representation of a connectivity information database specifying established POS data links in accordance with an exemplary implementation of the invention;

FIG. 3 is a schematic diagram showing another tabular representation of connectivity information specifying established POS data links in accordance with another exemplary implementation of the invention;

It will be noted that in the attached diagrams like features bear similar labels.

DETAILED DESCRIPTION OF THE EMBODIMENTS

Figure 1:
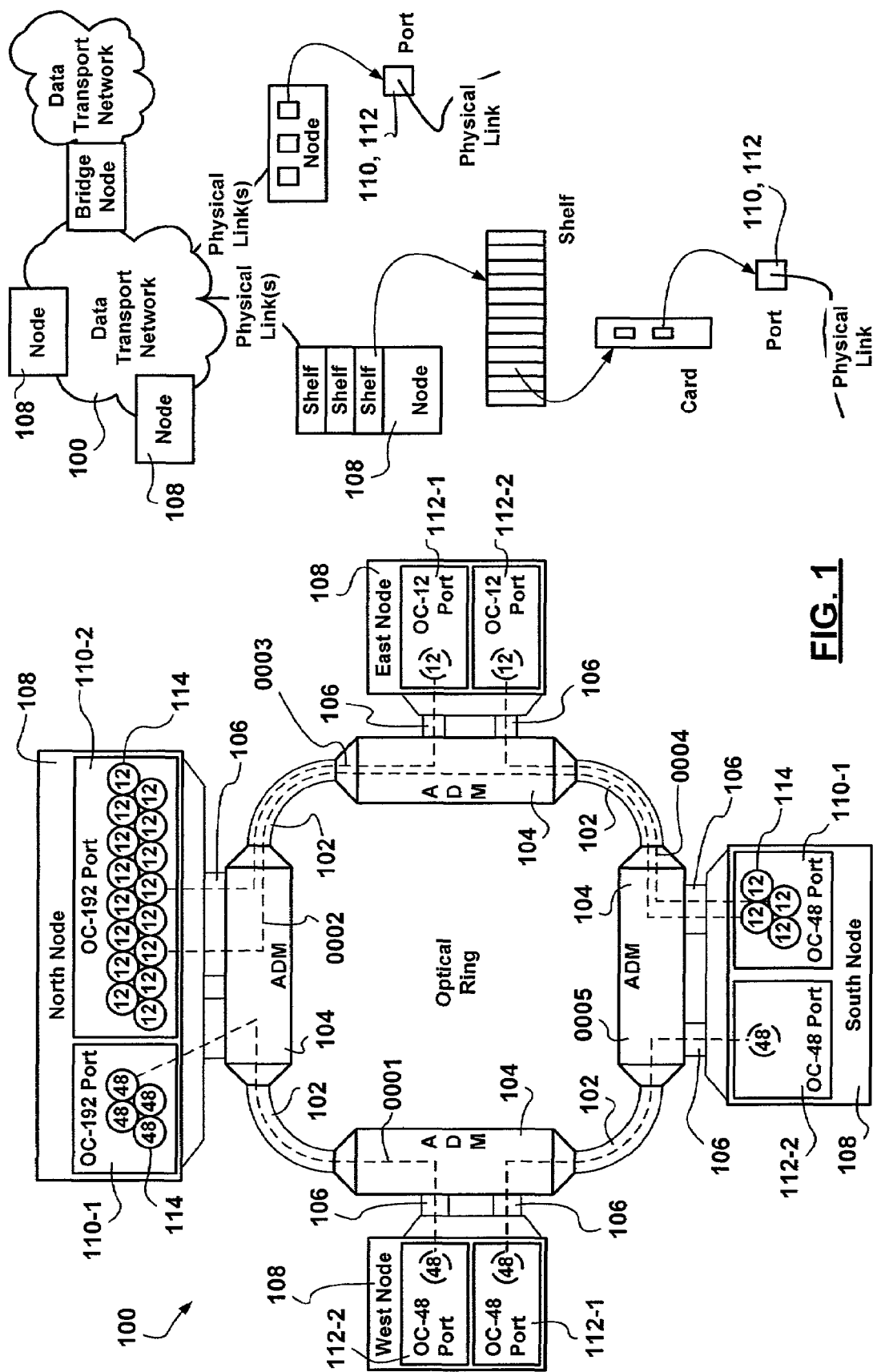
FIG. 1 is a schematic diagram showing a representation of SONET equipment provisioning data transport services.

FIG. 1 is a schematic diagram showing a representation of SONET equipment provisioning data transport services.

Data transport services are provisioned over a SONET network 100 having a ring topology. The invention is not limited to data transport networks having ring topologies. SONET technologies can be employed to implement network topologies such as, but not limited to: point-to-point, ring, star, mesh, etc.

Depicted physical Layer 1 devices include long haul optical cables 102, add/drop multiplexers 104, short haul copper/optical interconnects 106, nodes 108, etc. As it would be apparent to persons of ordinary skill in the art, a myriad of other devices employing SONET technologies may be used without departing from the spirit of the invention.

The nodes 108 are shown to have channelized ports 110 and unchannelized ports 112. Although only two ports 110 are shown per node 108 to enable easy presentation of relevant concepts, the invention is not limited thereto. A high level view of the data transport network 100 presented on the right, shows the ports 110/112 implemented on interface cards (either integrally or in combination), each card being installed in a shelf. Node 108 designs having multiple shelves exist and the invention applies equally thereto. An implementation of a node 108 having integral ports 110/112 is also shown.

The north node 108 is shown to have a channelized OC-192 port 110-1 partitioned into 4 OC-48 channels 114, as well as a second channelized OC-192 port 110-2 partitioned into 16 OC-12 channels 114. The west node 108 is shown to have two unchannelized OC-48 ports 112-1 and 112-2 while the east node 108 has two unchannelized OC-12 ports 112-1 and 112-2. The south node 108 has an OC-48 channelized port 110 partitioned into 4 OC-12 channels 114, and an unchannelized OC-48 port 112-2. The label indexes "-#" represent interface card identifiers within respective card shelves of nodes 108; their relevance will be more apparent from the description below with reference to FIG. 2, FIG. 3 and FIG. 5.

Also shown in the diagram are established POS data links 0001, 0002, 0003, 0004 and 0005 between the nodes 108.

As mentioned above, general knowledge in the art teaches the establishment of Layer 2 POS data links between POS ports. The analyst is required to have knowledge the configuration of each POS port whether channelized 110 or unchannelized 112.

In accordance with a preferred embodiment of the invention, each POS data link originates and terminates on a channel of a POS port. Since POS ports are not necessarily channelized, the invention teaches the virtual channelization of unchannelized POS ports—where each virtual channel has a bandwidth substantially equal to the physical bandwidth of the POS port. For example, the combination of the unchannelized OC-48 port bearing a virtual channel is representative of a channelized OC-48 port having one OC-48 channel.

In accordance with the preferred embodiment of the invention, a data link record is maintained for established POS data links between data network nodes supporting SONET data transfer technologies.

In accordance with the preferred embodiment of the invention, the connectivity information held in the data link record is extended to include channel specifications.

FIG. 2 is a schematic diagram showing a tabular representation of a connectivity information database specifying established POS data links in accordance with an exemplary implementation of the invention.

In accordance with a preferred implementation of the invention, data link record table 200 is shown to include row entries 202. Each entry 202 corresponds to an established POS data link in the managed data transport network 100. The data link record table 200 is representative of a connectivity database held centrally by a Network Management System (NMS). Alternatively the data link record table 200 may be replicated and maintained by multiple network management entities associated with the data transport network 100.

Each data link entry 202 holds a data link identifier 204 and perhaps a data link capacity label 206. Each entry 202 further includes origination 208 and destination 210 connectivity information for the corresponding established data link.

The origination connectivity information 208 and the destination connectivity information 210 include respectively: an origination/destination node identifier 212 for the corresponding data link end, a shelf designation 214 for an associated interface card whose designation is specified at 216, the interface card being connected to a corresponding slot having a designation 218 on the shelf 214, and a port designation 220 of a port on the interface card 216.

If the port 220 is channelized, the connectivity information 208/210 includes a channel specification 224.

In accordance with the invention, if the port 220 is unchannelized, the connectivity information 208/210 includes a virtual channel specification 224. The virtual channel specification 224 is shown in FIG. 2, between parentheses for emphasis.

The connectivity information held in the data link record 200 is not limited to the specifiers shown. In accordance with an exemplary implementation of the invention, the connectivity information 208/210 may further include a port type specification 222 for each port 220 detailing whether the port 220 is channelized or unchannelized.

POS data links include unidirectional links and bidirectional links. For unidirectional links, the direction of the data flow may be inferred from the origination 208 and destination 210 connectivity information. In accordance with another exemplary implementation of the invention, entries 202 in the data link record 200 may include an additional specifier holding directionality information. An example of a directionality specifier will be presented below with reference to FIG. 3.

Other specifiers may be used for each entry 202 to specify the type of data traffic conveyed e.g. Voice traffic, POS traffic, etc.

FIG. 3 is a schematic diagram showing another tabular representation of connectivity information specifying established POS data links in accordance with another exemplary implementation of the invention.

In accordance with another exemplary implementation of the invention, a data link record table 300 is associated with a corresponding data network node 108 and includes row entries 302. Each entry 302 corresponds to an established POS data link in the managed data transport network 100.

Each data link entry 302 holds a data link identifier 304 and perhaps a data link capacity label 306. Each entry 302 specifies further connectivity information for the corresponding data link including: a shelf designation 314 for an associated interface card whose designation is specified at 316, the interface card being connected to a corresponding slot having a designation 318 on the shelf 314, and a port designation 320 of a port on the interface card 316.

In accordance with another exemplary implementation of the invention, the connectivity information further includes a port type specification 322 for each port 320 detailing whether the port 320 is channelized or unchannelized.

In accordance with the invention, if the port 320 is channelized, the connectivity information includes a channel specification 324. If the port 320 is unchannelized, the connectivity information includes a virtual channel specification 324. The virtual channel specification 324 is shown in FIG. 3 between parentheses for emphasis.

In accordance with a further exemplary implementation of the invention, an NMS system inspects each nodal data link record 300 in deriving connectivity information regarding the entire network 100 using data link identifiers 304 to correlate entries 302 between multiple nodal data link records 300.

Entries 302 may contain other connectivity information including, but not limited to data transfer directionality information 326.

The invention is not limited to the implementations of the data link records 200 and 300 presented above. Persons of skill in the art would recognize that the data link record 200 can be generated from a plurality of data link records 300 and vice versa.

The invention also applies to cases in which only partial data link information is available such as data link connectivity information being available only with respect to one termination thereof—for example due to a node failure. The missing connectivity information may be regenerated through a discovery process using data link connectivity information synchronization (element synchronization) processes.

The discovery process may be initiated by higher level protocols such as would otherwise be the case during failure recovery. The discovery process may make use of handshaking processes provided by the underlying SONET equipment. The discovery process determines: shelf designation, interface card designations, port designations, port configuration, and channel designations for the opposite terminations of the corresponding data links. In accordance with the invention, once an unchannelized port is encountered by the discovery process as a data link termination, a virtual channel is assigned thereto.

It is further desirable for an NMS system to provide a concise yet comprehensive interface displaying a current state of the data transport network 100 that is easy to understand for an analyst using a simple representation of the network topology.

In accordance with the invention, the NMS interface shows the connectivity information irrespective of the channelized/unchannelized configuration of POS ports. Once a concise and comprehensive network topology view is provided, service related information may be overlaid further aiding the maintenance and administration of the data transport network and services provisioned therein.

In accordance with the preferred embodiment of the invention, in displaying a concise and comprehensive topological view of data transport network 100, it is desirable to graphically display connectivity information eliminating intermediary data transport equipment.

Figures 4, 5:
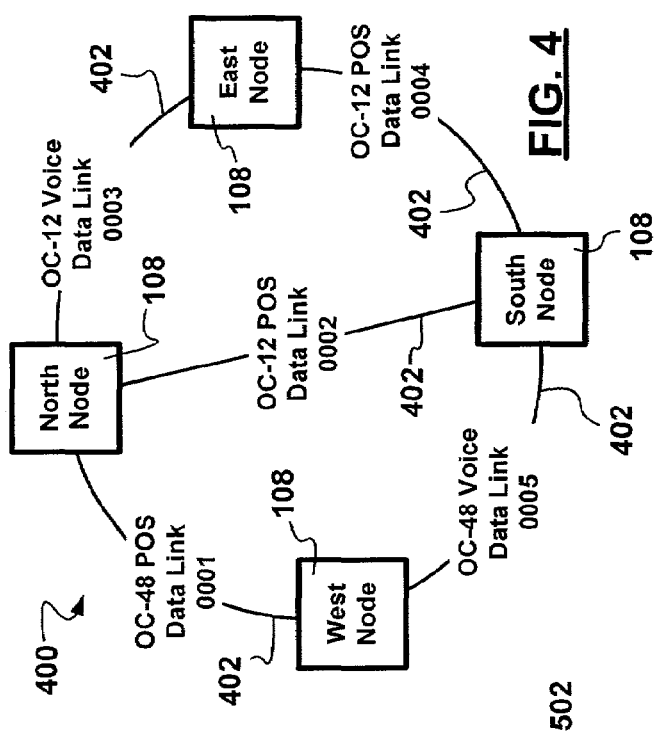
FIG. 4 is a schematic diagram showing a simplified representation of POS data links provisioned via SONET nodes, in accordance with a preferred implementation of the invention.
FIG. 5 is a schematic diagram showing a tabular representation of connectivity information specifying available data link terminations in accordance with another embodiment of the invention.

FIG. 4 is a schematic diagram showing a simplified representation of POS data links provided via SONET nodes, in accordance with a preferred implementation of the invention.

A representation 400 of the data transport network 100 is show to include data network nodes 108 and provisioned data links 402. Each one of the data network node 108 is positioned using geographic positional information associated with each data network node 108 or using an algorithm taking into account the type of data transport network (ring, linear, star, mesh, etc.) Each data link 402 is shown as a schematic direct connection between the data network nodes 108 associated therewith.

In a process of displaying the topology of a data transport network 100 for data transport network management and administration, the data link records 200/300 are parsed to examine the entries 202/302. In examining each one of the data link entries 202/302 held therein, data network node specifications 212/312 are extracted and the corresponding nodes 108 displayed on the interface associated with the NMS system. Data links 402 are shown schematically connecting the end nodes 212/312 extracted. The schematic representation of each data link 402 may include the data link specifier 204/304 and perhaps the data link capacity 206/306.

In accordance with the invention, each displayed data link 402 represents a logical data link between data network nodes 108 for it only shows data link terminations as opposed to the corresponding physical data link shown in FIG. 1—without the intermediary devices via which the physical data link is provisioned.

The schematic representation 402 may include a traffic type specifier associated with a corresponding service provisioned therethrough such as, but not limited to: Voice, POS, etc.

An analyst interacting with an NMS system, besides being able to inspect a current state of the data transport network 100 may be required to provision data links.

In accordance with another aspect of the invention, a channel record is provided to enable selection of data link terminations in provisioning data links.

FIG. 5 is a schematic diagram showing a tabular representation of connectivity information specifying available data link terminations in accordance with another embodiment of the invention.

A channel record table representation 500 includes channel entries 502 corresponding to each channel in service. The channel record 500 is representative of global connectivity information held either centrally and/or distributed. The invention is not limited thereto, nodal channel records may also be maintained, either centrally and/or in a distributed fashion.

Each entry 502 specifies connectivity information for a corresponding provisioned channel including but not limited to: a node identifier 512, a shelf designation 514 for an associated interface card whose designation is specified at 516, the interface card being connected to a corresponding slot having a designation 518 on the shelf 514, and a port designation 520 of a port on the interface card 516.

In accordance with an exemplary implementation of the invention, the connectivity information further includes a port type specification 522 for each port 520 detailing whether the port 520 is channelized or unchannelized.

In accordance with the invention, if the port 520 is channelized, the connectivity information includes a channel specification 524. If the port 520 is unchannelized, the connectivity information includes a virtual channel specification 524. The virtual channel specification 524 is show in FIG. 5 between parentheses for emphasis.

The connectivity information held in the channel record 500 is not limited to the specifiers shown. A channel capacity specification is shown at 506. Channel specification may further include data transfer directionality. An example of a directionality specifier has been presented above with reference to FIG. 3.

Figure 6:
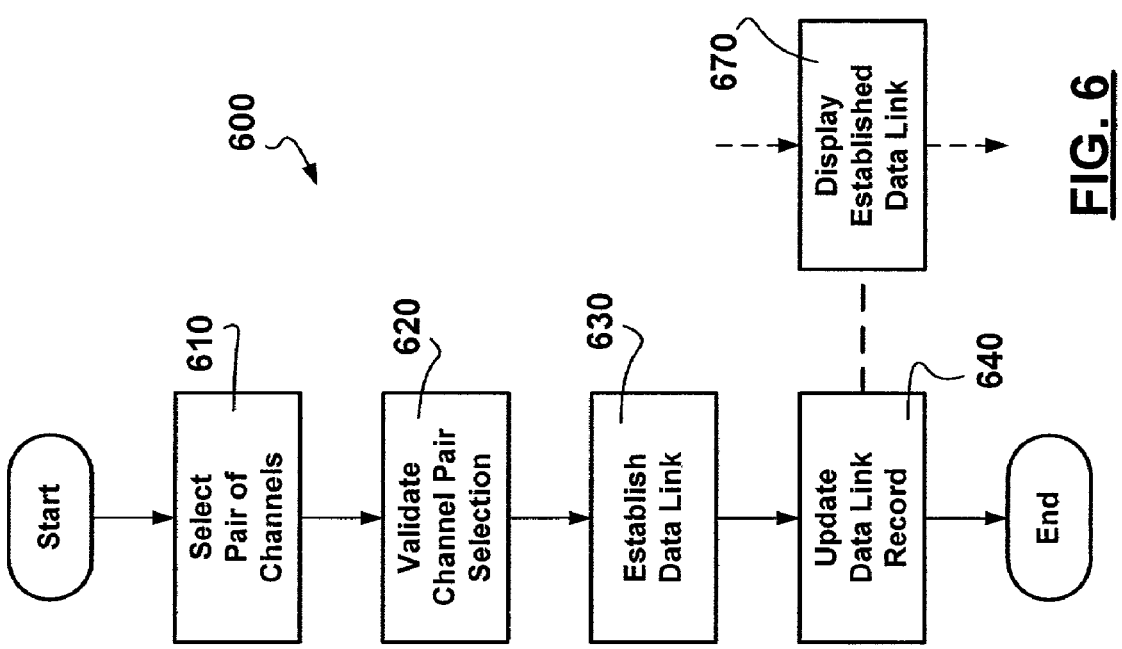
FIG. 6 is a schematic diagram showing process (600) of provisioning a data link in accordance with a preferred embodiment of the invention.

FIG. 6 is a schematic diagram showing process (600) of provisioning a data link in accordance with a preferred embodiment of the invention.

In provisioning data links, the analyst is presented with the information held in the channel record 500 whether in the tabular format shown, a selection list, etc. Data link provisioning may include a search function limiting the presented connectivity information by node identifier, capacity, etc. The analyst selects 610 at least two entries 502 to establish data links therebetween.

The channel record entry 502 selection for the establishment of a data link therebetween, further includes (620) checking for bandwidth compatibility and the displaying of error messages should an incompatibility exist. In the case in which interface cards supporting other data transmission protocols, the selection also checks whether the same data transmission protocol is supported therebetween.

Once a data link is established 630, an appropriate data link entry 202/302 is created (640) in the maintained data link record(s) 200/300. Subsequently, the NMS system displays (670) the created data link 402. The display of the created data link 402 need not necessarily be performed by the data link creation process as the display functionality of the NMS system may be part of another execution thread (as shown).

The discovery of participating data network nodes 108 in a data transport network and the generation of channel records such as 500 may be provided via a reconciliation process.

Figure 7:
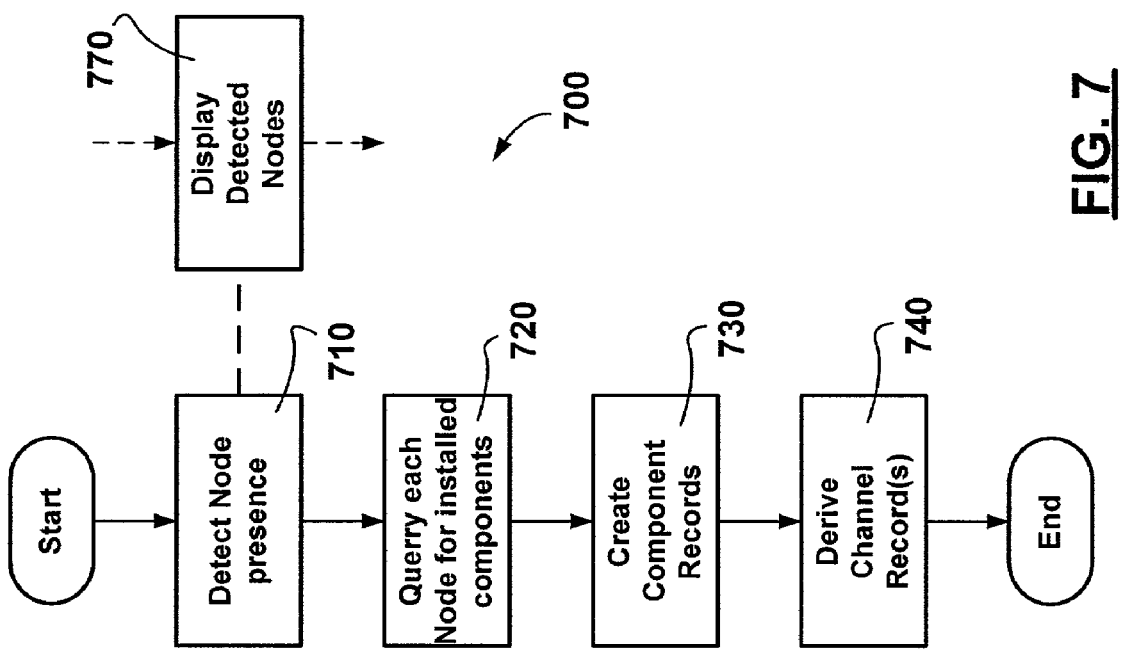
FIG. 7 is a schematic diagram showing a process (700) of node reconciliation in accordance with a preferred embodiment of the invention.

FIG. 7 is a schematic diagram showing a process (700) of node reconciliation in accordance with a preferred embodiment of the invention.

In performing node reconciliation 700, an NMS system broadcasts a request for each node to signal its presence in a data network domain (710). Upon receipt of each response, the NMS system may display (770) the corresponding node 108 to enable selection thereof in creating data links 402. The display 770 of the detected nodes 108 may be performed as part of a parallel processing thread as shown.

Each data network node 108 having responded to the request 710, is queried 720 to determine what components are installed thereon. The query-response process 720 is implemented with the aid of administration and management protocols such as but not limited to a Simple Network Management Protocol (SNMP). The reconciliation process is not limited to request broadcasting.

The responses (720) provide a node configuration including as physical devices: shelves, empty slots, configured slots containing interface cards, interface card activation status, interface card port configuration, etc.

The received node configuration is preferably captured 730 in a hierarchical group of data records including: node records, shelf records, interface card records, port records, etc.

In accordance with the invention, each port is assumed to have at least one channel associated therewith. Channel records (500) are derived 740 from channelized port configurations and channel entries are generated for each unchannelized port specifying the full bandwidth of the port as the bandwidth of a corresponding virtual channel.

The embodiments presented are exemplary only and persons skilled in the art would appreciate that variations to the above described embodiments may be made without departing from the spirit of the invention. The scope of the invention is solely defined by the appended claims.

We claim:

1. A method of visualizing Packet over SONET (PoS) links in a data communications network, the method comprising:
   maintaining connectivity information between nodes in the form of a plurality of data link records, each data link record corresponding to one link and one port on one node, the data link records having the seine structure for channelized and unchannelized port types and the same structure for port-port, port-channel, and channel-channel connection types; and
   displaying PoS links of interest in a similar manner, regardless of the port type of ports bounding each PoS link and regardless of connection type of each link.

2. The method of claim 1 wherein maintaining connectivity information comprises populating each data link record with the port type of the link on the node of data link record, and with a channel number, the channel number being either a real channel number if the port type of the data link record is channelized or a virtual channel number if the port type of the data link record is unchannelized.

3. The method of claim 2 wherein at least one data link record corresponds to a link on a channelized port and at least one data link record corresponds to a link on an unchannelized port.

4. The method of claim 2 wherein at least two data link records correspond to Links having different connection types, the connection types being one of port-port, port-channel, and channel-channel.

5. The method of claim 2 further comprising identifying two nodes of interest, and wherein displaying PoS links comprises displaying all PoS links between the two nodes of interest in a similar way regardless of the port type of ports bounding each PoS link and regardless of connection type of each link.

6. The method of claim 5 further comprising more than two nodes of interest, and wherein displaying PoS links comprises displaying all PoS links between the nodes of interest in a similar way regardless of the port type of ports bounding each PoS link and regardless of connection type of each link.

7. The method of claim 5 wherein displaying all PoS links between the two nodes comprises displaying only the PoS links without displaying underlying physical network information.

* * * * *